(12) United States Patent
Floe

(10) Patent No.: US 6,733,219 B1
(45) Date of Patent: May 11, 2004

(54) TRAILER STRUCTURES

(76) Inventor: Wayne G. Floe, 48473 State Hwy. 65, McGregor (Aitkin County), MN (US) 55760-9514

( * ) Notice: Subject to any disclaimer, the term of this patent is extended or adjusted under 35 U.S.C. 154(b) by 0 days.

(21) Appl. No.: 09/931,709

(22) Filed: Aug. 16, 2001

(51) Int. Cl.$^7$ .................................................. B60P 3/06
(52) U.S. Cl. ........................ 410/3; 296/57.1; 298/17 SG
(58) Field of Search ................... 410/2, 3, 4, 7, 410/8, 9, 10, 11, 19, 23, 104; 296/50, 57.1, 106, 181, 182; 298/17 SG; 414/480, 482, 485, 537

(56) References Cited

U.S. PATENT DOCUMENTS

| | | | | |
|---|---|---|---|---|
| 3,565,272 A | * | 2/1971 | Schettler et al. | 414/482 |
| 3,604,579 A | * | 9/1971 | Jenkins | 414/482 |
| 3,620,397 A | * | 11/1971 | Gagnon | 414/482 |
| 3,693,818 A | * | 9/1972 | Teagarden | 254/3 R |
| 3,700,124 A | * | 10/1972 | Lawrence | 414/537 |
| 3,720,336 A | * | 3/1973 | Murray et al. | 414/470 |
| 3,726,423 A | * | 4/1973 | Miron | 414/480 |
| 3,757,972 A | * | 9/1973 | Martin | 414/537 |
| 3,866,771 A | * | 2/1975 | Reid et al. | 414/537 |
| 3,927,775 A | * | 12/1975 | Graupmann | 414/357 |
| 3,935,954 A | * | 2/1976 | Woods et al. | 414/24.5 |
| 4,318,658 A | * | 3/1982 | McIntyre | 414/480 |
| 4,498,836 A | * | 2/1985 | Love | 414/537 |
| 4,514,132 A | * | 4/1985 | Law et al. | 414/537 |
| 4,607,996 A | * | 8/1986 | Koch | 414/537 |
| 4,647,270 A | * | 3/1987 | Maloney | 414/470 |
| 4,657,233 A | * | 4/1987 | Vroom | 267/155 |
| 4,784,545 A | * | 11/1988 | Lawrence | 410/26 |
| 4,813,841 A | * | 3/1989 | Eischen | 414/477 |
| 5,540,538 A | * | 7/1996 | Head, Sr. | 414/485 |
| 5,829,947 A | * | 11/1998 | Litten | 414/537 |
| 6,164,882 A | * | 12/2000 | Selle | 410/3 |
| 6,238,153 B1 | * | 5/2001 | Karrer | 410/102 |
| 6,386,819 B1 | * | 5/2002 | Schultz | 414/537 |
| 6,439,814 B1 | * | 8/2002 | Floe | 410/7 |

* cited by examiner

Primary Examiner—D. Glenn Dayoan
Assistant Examiner—H. Gutman
(74) Attorney, Agent, or Firm—Charles A. Johnson

(57) ABSTRACT

Trailer structure having a tilt limiting loading ramp and an improved structural side member forming an adjustable axle mount and having a load tie down track is described. The trailer has a load supporting bed and utilizes a load tie down system having tie down tracks at each side and one or more additional tie down tracks at selected locations on the load supporting bed. One or more tie down devices are selectively positionable in each tie down track and are used to restrain various loads including various wheel supported loads. To accommodate a low trailer profile an improved tongue adaptor is provided. A fender mount structure to cooperate with the improved structural side member is also described. Improved loading ramp structures, including a tilt-bed loading ramp and a tilt limiting structure for limiting the angle of bed tilt for use on a tilt-bed trailer are shown. A rack structure to mount to the load tie down tracks in the structural side members is shown.

19 Claims, 12 Drawing Sheets

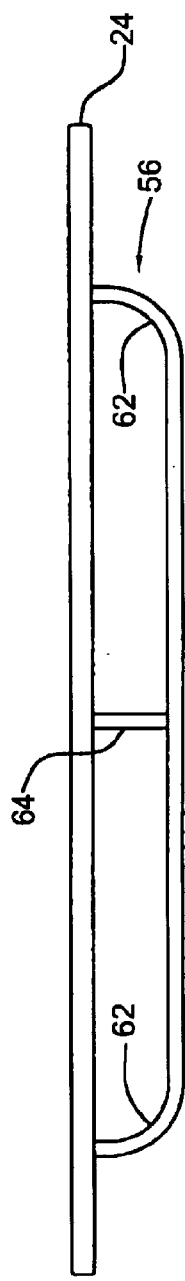
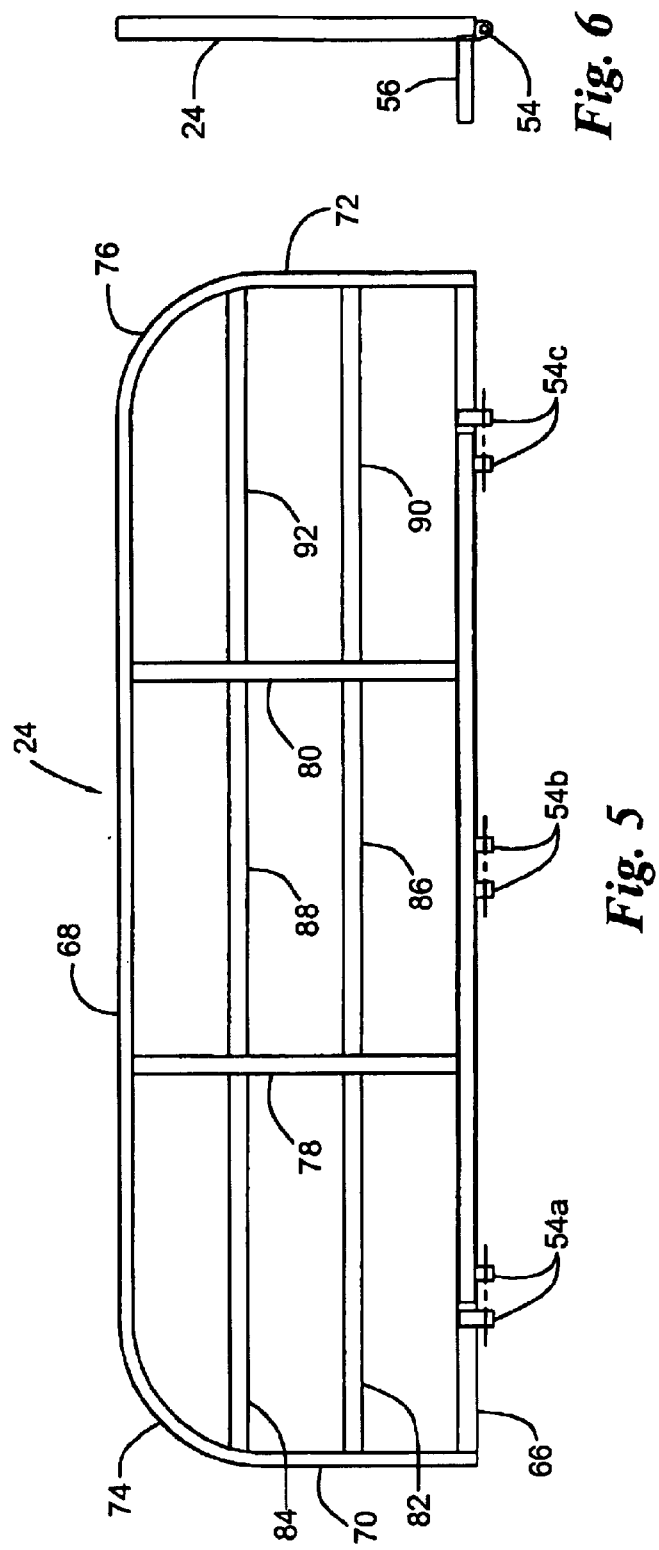

TRAILER STRUCTURES

CROSS REFERENCE TO CO PENDING APPLICATION

This application is related to commonly owned U.S. Pat. No. 6,439,814 patented Aug. 27, 2002, application Ser. No. 08/978,781, filed Nov. 26, 1997, and entitled "Trailer Structure & Tie Down Mechanism"; and is incorporated by reference.

BACKGROUND OF THE INVENTION

1. Field of the Invention

This invention relates to improvements in trailer structures; and, more particularly, to improved structural members. Still more particularly, the invention relates to improvements in trailers utilized for utility loads including wheel-supported loads.

2. State of the Prior Art

The use of utility trailers to transport all terrain vehicles (ATV's), riding lawn equipment, riding golf carts, and other wheel-supported loads are known. These include wheel-supported loads having two, three, four, or more wheels as well as wheel driven track systems. Various ramp devices have been developed to aid in the loading of such wheel-supported loads from the ground surface to the bed of the trailer. It has long been recognized that wheel-supported loads having aligned wheels and those having four or more wheels arranged in tandem pairs can be difficult or impossible to load if the ramp structure is too short and the angle of the ramp to the trailer bed is great enough for the wheel-supported load to engage the juncture of the ramp and the bed causing the leading wheels to fail to contact the surface of the bed. This high centering results in the load not being supported by one or more of its wheels. This phenomenon is particularly apparent in vehicles such as riding lawn mowers when the mowing deck is suspended between the wheels, ATVs, golf carts, and the like.

In fixed bed utility trailers, the problem of high centering loads has been addressed by making the ramp structure longer and longer to minimize the angle at which the ramp affixes to the trailer bed.

It is known in the prior art to provide a loading ramp that is hingedly mounted to a utility trailer bed and is operable to be raised forming an extended end gate when the trailer is in motion. Various types of hinged ramps have been developed, and have utilized various types of structural materials. The ramp structures of course had to be of sufficient strength to support the loads and had to be constructed to allow sufficient traction for wheel driven loads to move up the ramp. Solutions involving wooden structures were heavy, and required either some form of nonskid surfacing or cross cleats to engage the wheel driven load.

A common type of prior art ramp involves the use of meshed metal sheets supported on a sufficiently strong frame to support the load. In all cases the hinge mounted extended loading ramps are heavy and unwieldy to handle. They also cause an extensive wind drag when being towed due to the fact that they present a substantial surface that can extend five or more feet above the surface of the trailer bed.

It is desirable to provide a loading structure that minimizes the amount of material used in the loading ramp to minimize the cost of construction and maximize the ease of use. It is also desirable to provide a loading ramp structure that minimizes the air drag with its attendant loss of fuel efficiency for the towing vehicle, while providing positive traction for wheel driven loads.

Tilt-bed trailers were developed to assist moving loads from a ground surface to the trailer bed by causing the bed to tilt such that a loading edge would engage the ground surface. As a wheel-supported load is moved from the ground surface onto the trailer bed, the bed is allowed to rotate back into contact with the tongue such that the bed can be affixed to the tongue and the load moved. The prior art tilt-bed trailers work reasonably well where the length of the tilt-bed is sufficiently long to allow the angle of the bed to the ground surface to be relatively small. For short bed utility trailers with a tilt-bed, the problem is often encountered that the leading structure of the load impinges on the tilted bed at a point that inhibits the wheels from being allowed to come in contact with the trailer bed. A further problem exists, particularly with riding lawn mowers and the like, of a trailing structure engaging the ground surface as the load is moved onto the bed such that the rear wheels are lifted from contact with the ground or the trailer bed. Of course these conditions exist in reverse when the load is to be removed from the trailer bed to the ground surface.

The shorter tilt-bed trailers have the additional concern that the angle of loading is relatively steep. If care is not taken when moving the wheeled load onto the bed, the weight distribution can go past the balance point too quickly and cause the trailer bed to rotate sharply to the level position thereby causing a substantial jolt when the bed impacts the tongue. If the wheel-supported vehicle is ridden onto the trailer by a human operator, such a jolting action is uncomfortable and in some instances can cause injury.

It is desirable to provide an improved structure for use with tilt-bed utility trailers that minimizes the deficiencies and undesirable features of prior art tilt-bed trailers.

SUMMARY OF THE INVENTION

The present invention includes a lightweight aluminum trailer frame structure for use with a tilt-bed trailer and having a tilt limiting loading ramp coupled to the frame. The tilt limiting loading ramp includes a tilt limiting structure to engage the ground when the frame is tilted for loading, the range of tilt limitation being such that a trailer bed supported on the frame is substantially aligned with the ramp. The tilt limiting loading ramp is constructed of members arranged across the width of the trailer bed and spaced apart a sufficient distance to minimize wind drag when raised and the trailer is being towed, but close enough to prevent the wheels of a wheel supported load from passing between them as the load is being moved onto the trailer bed. The arrangement is such that the height of the tilt limiting loading ramp as it relates to the height of the tilt limiting structure establishes a predetermined ratio for establishing the slope of the ramp. This ratio is selected depending upon the length of the trailer bed to establish the desired alignment between the bed and the ramp.

Another aspect of the invention is an improved side structural member constructed of extruded non-corrosive metal, with one such member utilized at each side of a trailer bed frame. Each side structural member is cut to a predetermined length to establish the desired length of the trailer bed and includes a number of functional features in addition to providing frame structure. The side structural member includes an upper portion extending upwardly from the bed surface and has an upper channel for providing strength to the side structural member and for cooperating in mounting auxiliary fixtures. A face member extends downwardly from the upper portion and has a lower extremity. The face portion has an inner surface to which is integrally formed an elongated retention channel extending along the length of the side structural member. This retention channel functions in cooperation with slidably positionable tie-down loops to allow loads to be cross-tied between the oppositely disposed side structural members. Such cross tying is particularly beneficial for wheel-supported loads. The integrally formed retention channel is also used for mounting an auxiliary rack to the trailer structure. In addition to the upper portion, the face portion, and the integrally formed retention channel, an axle mounting and positioning structure can also be utilized. In such an additional configuration, an inner member is integrally formed and downwardly extending from the elongated retention channel and having a lower extremity. A lower channel structure is integrally formed and coupled to the lower extremity of the face portion and the lower extremity of the inner portion. The lower channel structure has a downward channel opening and a predetermined shape including a mounting structure having oppositely disposed ridge mounting surfaces. The lower channel structure is adapted for use in combination with a mating slidable axle support member that has a predetermined length and one or more threaded holes therethrough to mate with and slidably engage the oppositely disposed ridged mounting surfaces. This structure allows a supported axle to be moved to a predetermined desired position along the length of the side structural member and to be clamped in place when mounting bolts are tightened.

An improved fender mounting bracket for use with a low profile trailer with the bed mounted low between the wheels is provided. The fender bracket includes an upper portion to be gripped by the upper channel of the side structural member, a middle portion to which are affixed outwardly extending mounting structures, and a lower portion to be held in place in cooperation with an associated slidable axle support member. The mounting structures are outwardly extending and each include a longitudinal nut retention channel to allow one or more bolts through an associated fender to be tightened to associated captive nuts held within the channel. The mounting structures can also be utilized as support for steps at the front and the rear of a fender to allow an operator to step up onto the trailer structure.

Another aspect of the invention for low profile tilt-bed trailers is a hitch level adapter selected to have a height to maintain a trailer tongue at a predetermined level when hitched to a towing vehicle. A trailer tongue having oppositely disposed ridges along at least a portion of its length is rotatably coupled to the tilt-bed trailer frame structure. The hitch adapter includes an upper box beam structure having an upper surface for mounting a trailer hitch. A pair of downwardly extending oppositely disposed gripping members are provided to cooperate with and grip the ridges on the trailer tongue. Bolts through the downwardly extending members and the trailer tongue hold the hitch adapter firmly in place.

An improved tilt-bed trailer has supporting means for supporting trailer bed means with such supporting means including side structural means for mounting a wheel assembly. Bed means are mounted on the supporting means for supporting a load. Tongue means are rotatably coupled to the supporting means for allowing the trailer to be towed, and for allowing the supporting means to rotate the bed means with respect to the tongue means. Tongue means are provided for releasably coupling the tongue means to the supporting means to allow the bed means to be tilted when released. Ramp means are hingedly coupled to the supporting means for loading and unloading a wheel supported load, with the ramp means including tilt limiting means for engaging a loading surface and limiting the slope of tilt of the bed means in a manner such that the ramp means and bed means are substantially aligned when loading or unloading a wheel supported load. The side structural means includes means for releasably holding slidably adjustable tie down means for tying down a load. The side structural means can further include a mounting means for adjustably mounting a wheel assembly at any desired position along the length of the side structural means. Auxiliary fender mounting means can be coupled to the side structural means for mounting an associated fender in a desired position along the side structural means. A height adapting means is provided for cooperation with the tongue means to establish a predetermined height adjustment for an associated hitch with respect to a towing vehicle.

BRIEF DESCRIPTION OF THE DRAWINGS

FIG. 4 is a top view of the tilt limiting loading ramp;

FIG. 5 is a face view of the tilt limiting loading ramp;

FIG. 6 is an end view of the tilt limiting loading ramp;

DESCRIPTION OF THE PREFERRED EMBODIMENT

Figure 1:
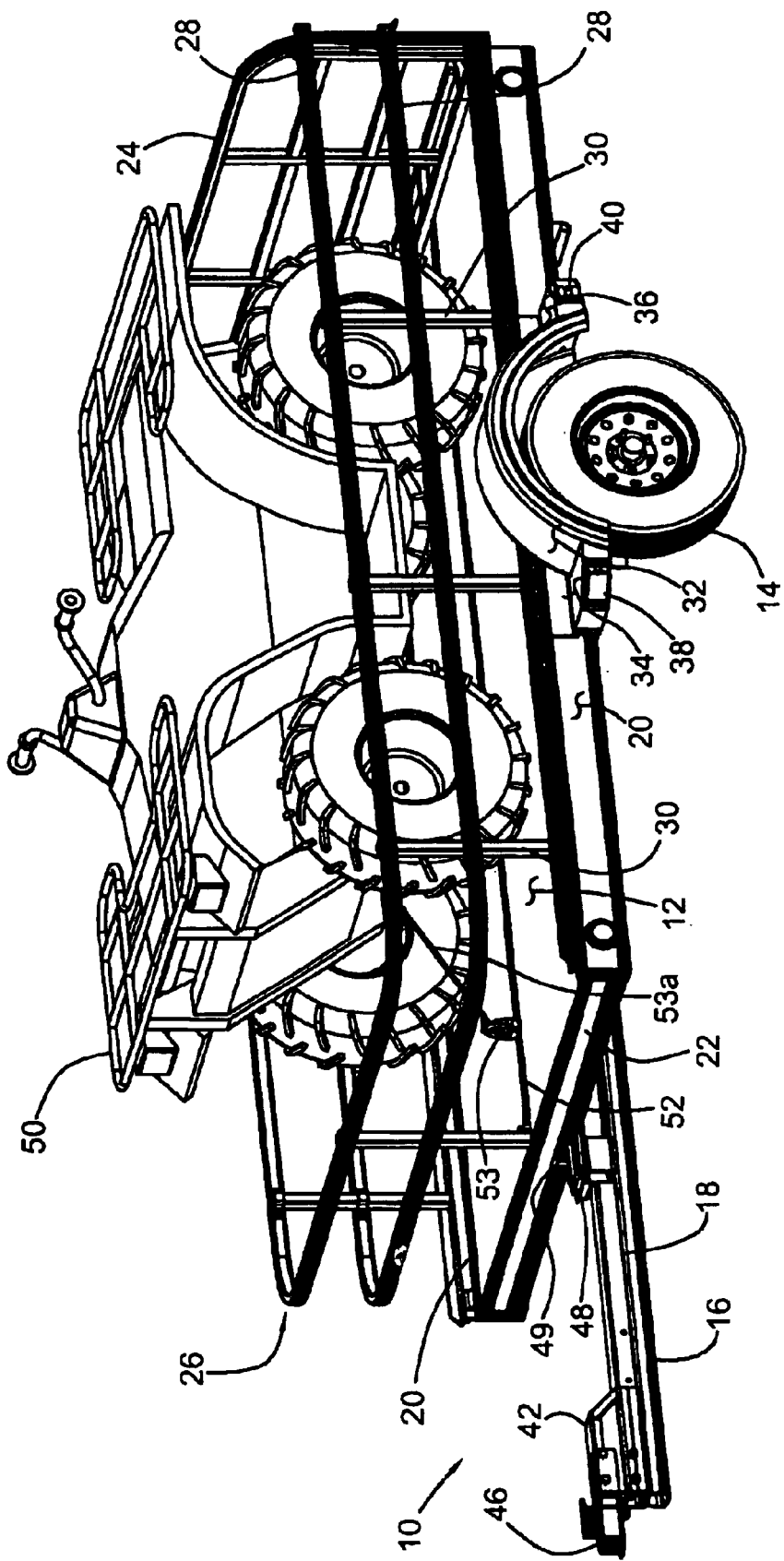
FIG. 1 is a partial view of a tilt-bed trailer carrying an all terrain vehicle.

FIG. 1 is partial view of a tilt-bed trailer carrying an all terrain vehicle. The trailer 10 has a bed 12 supported by a pair of wheels 14, with bed 12 rotatably coupled to tongue 16. Tongue 16 is elongated and has oppositely disposed channels 18 running along its length. A suitable tongue is described in U.S. Pat. No. 5,421,612 entitled Trailer and Tongue Structure, issued to Wayne G. Floe. Other tongue structures could also be utilized. Bed 12 is supported between side members 20 and is supported by front member 22. A rear member (not shown) supports the bed 12 and a hinge structure (not shown) for mounting loading ramp 24. A railing structure 26 is made up of spaced-apart railing members 28 mounted on a number of posts 30 and is affixed to side members 20, as will be described in more detail below. Wheels 14 are supported by an axle (not shown), with the bed 12 and its support framing mounted between the wheels and low on the axle to provide a low profile. The fenders 32 are mounted to the side structural members 20, and are constructed of metal or high density plastic. A front step 34 and a rear step 36 allow a user to easily step up to enter the trailer. An optional step structure can be provided at the top of fender 32. Lights or reflectors 38 and 40 are mounted to steps 34 and 36, respectively.

The tongue 16 has an adapter 42 mounted at its leading end, and has a ball hitch 46 mounted to the adapter. The adapter 46 is configured to cooperate with the structure of tongue 16, and will be described in more detail below.

The bed 12 is retained by release mechanism 48 that functions to restrain the bed 12 in a fixed relationship with tongue 16, or to selectively release the bed to allow tilting with respect to the tongue. A number of mechanisms 48 are available, such as a pin inserted through mating holes in the tongue, rotatable catch mechanisms, spring loaded catch mechanisms, and the like. A bed retention mechanism that slidably cooperates with the tongue structure is shown in U.S. Pat. No. 6,068,282 entitled, Tongue Retention and Release Mechanism, issued to Wayne G. Floe, which is incorporated herein by reference. Such a bed retention mechanism utilizes a gripping portion that cooperates with the channels 18 in tongue 16 and a mounting channel supported by the bed structure. A tension device 49 operates to hold the mechanism 48 in fixed contact on tongue 16, or to selectively release mechanism 48 to move forward on tongue 16 to thereby release the bed to rotate.

The all terrain vehicle (ATV) 50 is supported on bed 12. A longitudinal tie down track or retention channel 52 restrains a tie down loop 53 in order to hold one or more tie down lines 53a to hold the ATV in place on bed 12. One or more tie down loops 53 can be disposed along the length of track 52 to allow various configurations of tie down placements. The tie down track utilizes a track opening that is narrower than the channel opening, and retention mechanism disposed within the channel, to which the tie down loop is affixed. A load retention system that satisfies these requirements is shown in U.S. Pat. No. 6,439,814 entitled, "Trailer Structure and Tie Down System", issued to Wayne G. Floe, which is incorporated herein by reference. Additional novel tie down structures incorporated in side structural members 20 will be described below.

Figure 2:
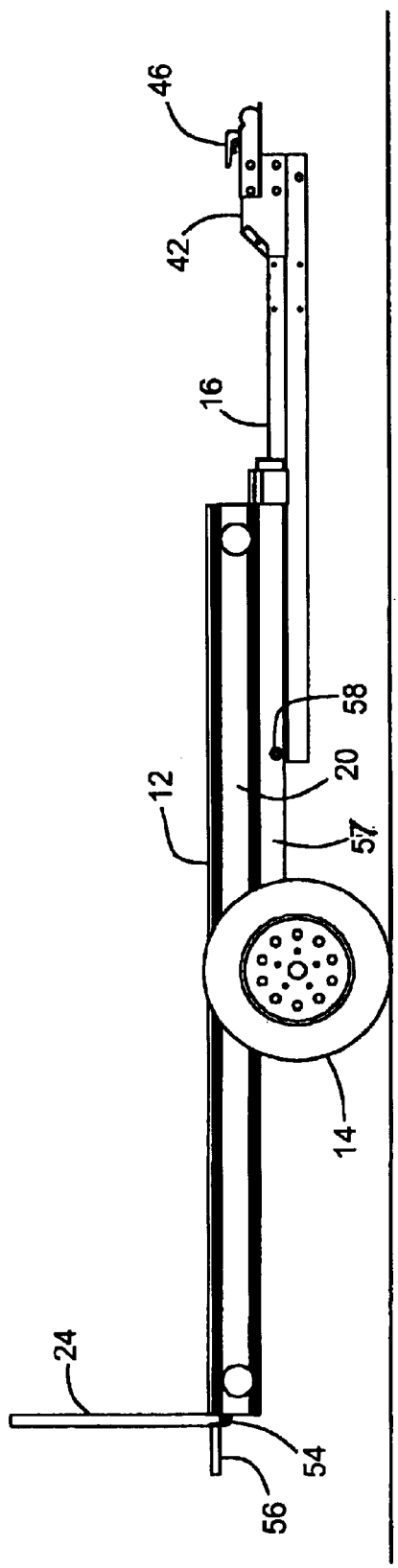
FIG. 2 is a side view of a tilt-bed trailer with a tilt limiting loading ramp raised.

FIG. 2 is a side view of a tilt-bed trailer with a tilt limiting loading ramp raised. The low profile bed 12 is shown supported on support structure 57, which in turn is supported on tongue 16. Tilt loading ramp 24 is mounted by hinge structure 54 to a rear structural member (not shown) in an upright position, thereby forming an end gate. A tilt limiting structure 56 is affixed as a tilt limiting mechanism. The depth of the tilt limiting structure 56 is selected to stop the tilt of bed 12 when the tilt limiting structure 56 engages the loading surface with the tilt loading ramp 24 in alignment with the surface of bed 12. The tongue 16 is rotatably coupled to support structure 57 by rotatable coupling 58.

Figure 3:
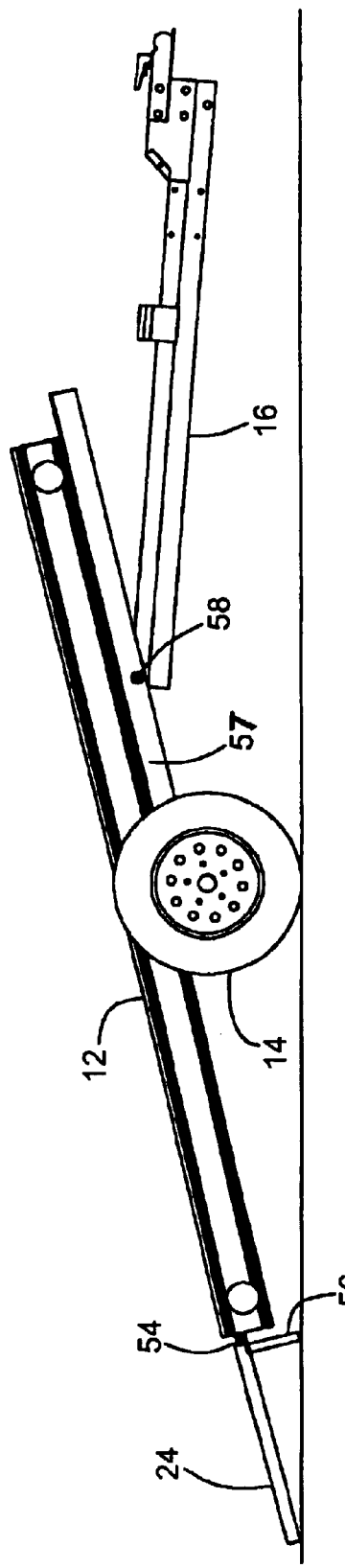
FIG. 3 is a side view of a tilt-bed trailer with the bed tilted to a degree limited by the tilt limiting loading ramp.

FIG. 3 is a side view of a tilt-bed trailer with the bed tilted to a degree limited by the tilt limiting loading ramp. The loading ramp 24 is substantially aligned with the surface of bed 12, with the tilt limiting structure 56 in contact with the loading surface. The support structure 57 is rotated out of contact with tongue 16. As will be described in more detail below, the tilt limiting structure 56 extends across a substantial part of the width of bed 12 and is of sufficient strength to support the load as it rolls onto the surface of bed 12, while it functions to limit the level of tilt of the bed. By way of example, with a bed length of about nine feet, the height of tilt loading ramp 24 can be in the order of about two feet, thereby providing minimal wind drag when in the upright position and the trailer is being towed. Of course a greater height will reduce the angle of bed 12 with respect to the loading surface, and a lesser height will increase the angle.

FIG. 4 is a top view of the tilt limiting loading ramp. As shown, the upper surface of loading ramp 24 has a number of longitudinal ridges. These ridges provide traction as a wheeled load is driven onto the trailer, additional structural rigidity to minimize bending or deforming, and resistance to surface marring from use. Tilt limiting structure 56 includes a longitudinal surface engaging portion 6o and a pair of curved portions 62 that are affixed substantially perpendicular to loading ramp 24. In this configuration a support member 64 is coupled between portion 60 and loading ramp 24. This configuration is acceptable for ATVs and the usual wheel supported loads that would be encountered, but for heavier than usual loads, it may be desirable to utilize one or more additional support members 64.

FIG. 5 is a face view of the tilt limiting loading ramp. Loading ramp 24 has a lower member 66 that support hinge pairs 54a, 54b, and 54c. These hinge pairs are arranged to cooperate with mating hinge elements mounted on a rear trailer structural member, and to be held in place with hinge pins (not shown). A top member 68 is parallel to lower member 66. A pair of side members 70 and 72 are each coupled at a lower end to lower member 66, and have curved portions 74 and 76, respectively, coupled to top member 68. Members 78 and 80 are spaced apart and are coupled at their respective lower end to lower member 66 and at their respective upper ends to top member 68. Members 78 and 8o have an I-beam cross-section in the preferred embodiment to provide strength, but these members could also have round or square cross-section. Side members 70 and 72 have a channel cross-section in the preferred embodiment, but it is understood that these too could have different cross-sections. Cross members 82 and 84 are affixed between side member 70 and member 78; cross members 86 and 88 are affixed between members 78 and 80; and cross members 90 and 92 are affixed between member 80 and side member 72.

With a loading ramp having a height of about two feet, and each of the structural members having at least a one inch cross-section, the spacing between the cross members will not exceed eight inches. For ATVs and the like, this spacing is sufficient to engage the wheels and allow them to "walk" up the ramp without falling through. If smaller wheeled loads are to be loaded, it may be necessary to provide additional cross members to engage the smaller wheels. In the preferred embodiment the cross members have a box channel cross-section and are of a dimension to fit within the channel of the I-beams and the channels of the side members and are welded at their respective ends. In the preferred embodiment all of the members are manufactured from extruded aluminum to minimize the weight, provide a non-corrosive structure, and provide sufficient strength. It is of course understood that other materials and fabrication techniques can be used without departing from the scope of the invention.

FIG. 6 is an end view of the tilt limiting loading ramp. Loading ramp 24 is substantially perpendicular to tilt limiting structure 56. With a ramp height of about two feet, it has been found to be advantageous to provide a tilt limiting support 56 having a height of about six inches, thereby establishing about a 4:1 slope. As mentioned, the relationship of the height of ramp 24 to the height of tilt limiting support 56 can be adjusted to establish the desired slope ratio.

Figure 7:
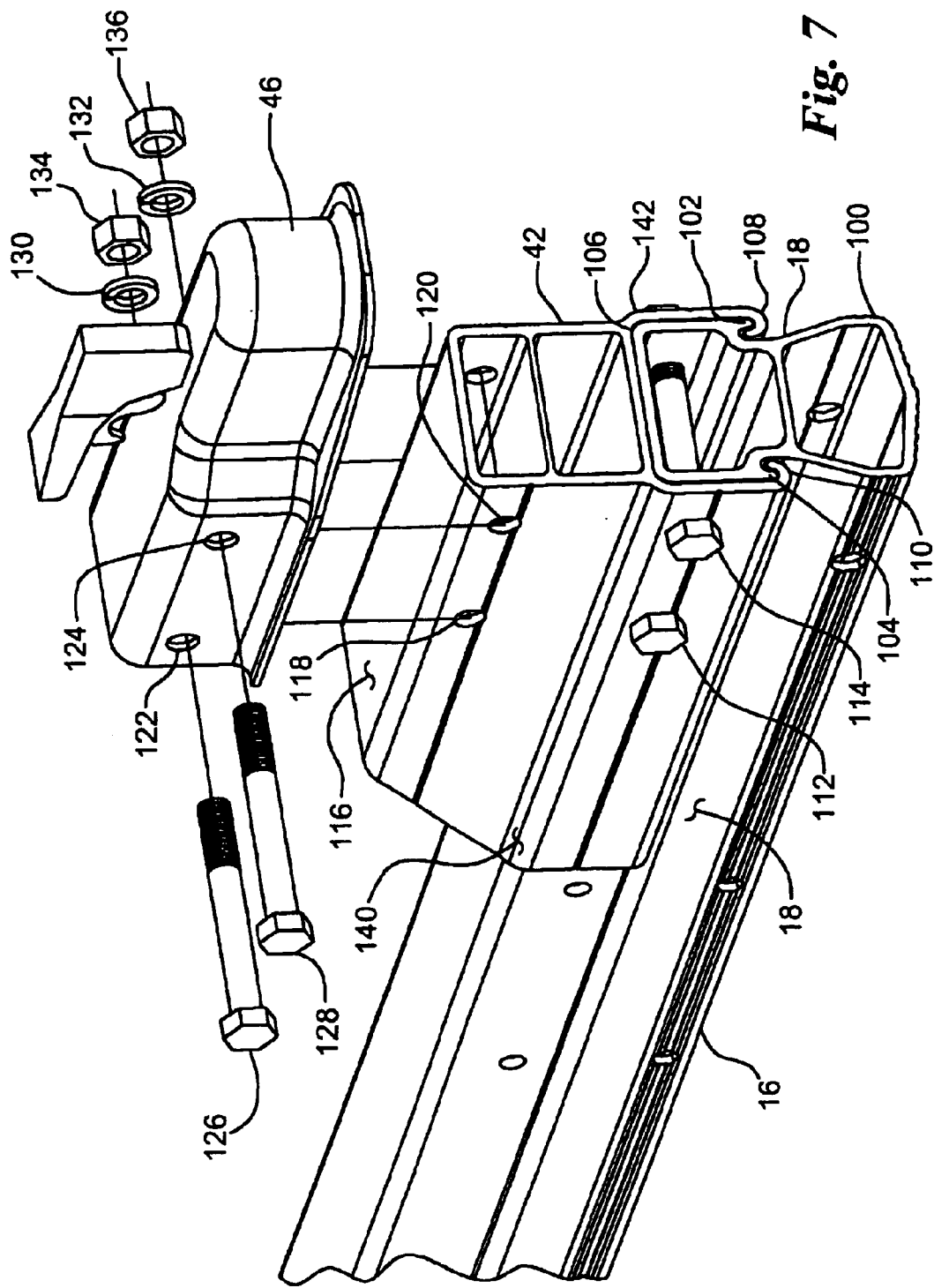
FIG. 7 is a partially exploded view of a tongue adapter mounted to a trailer tongue and a ball trailer hitch.

FIG. 7 is a partially exploded view of a tongue adapter mounted to a trailer tongue and a ball trailer hitch. Adapter 42 is utilized to position the ball trailer hitch 46 at a height to accommodate a trailer hitch on a towing vehicle, and is primarily necessary for use with a low profile tilt-bed trailer. Tongue 16 has a cross-section 100 that illustrates the longitudinal protrusions 102 and 104 along channels 18. Adapter 42 has a cross-section 106 and has gripping portions 108 and 110 that engage protrusions 102 and 104, respectively. A pair of bolts 112 and 114 affix adapter 42 to tongue 16. The adapter 42 has an upper surface 116 to support ball hitch 46 with holes 118 and 120 in alignment with holes 122 and 124, respectively. When thus aligned, bolts 126 and 128 are inserted through holes 122 and 124, respectively, and thence through washers 130 and 132 to nuts 134 and 136, respectively. Adapter 42 is a dual box beam cross-section for strength, and is of sufficient length to engage tongue 16 and support the load applied at the hitch. Shoulders 140 and 142 engage the upper surface of tongue 16 and assist in keeping adapter 42 aligned along tongue 16. In the preferred embodiment, adapter 42 is fabricated from extruded aluminum, though other materials can be utilized. The height of adapter 42 is selected in combination with the trailer wheel radius to keep the bed 12 substantially level when the trailer is hitched to a towing vehicle.

Figure 8:
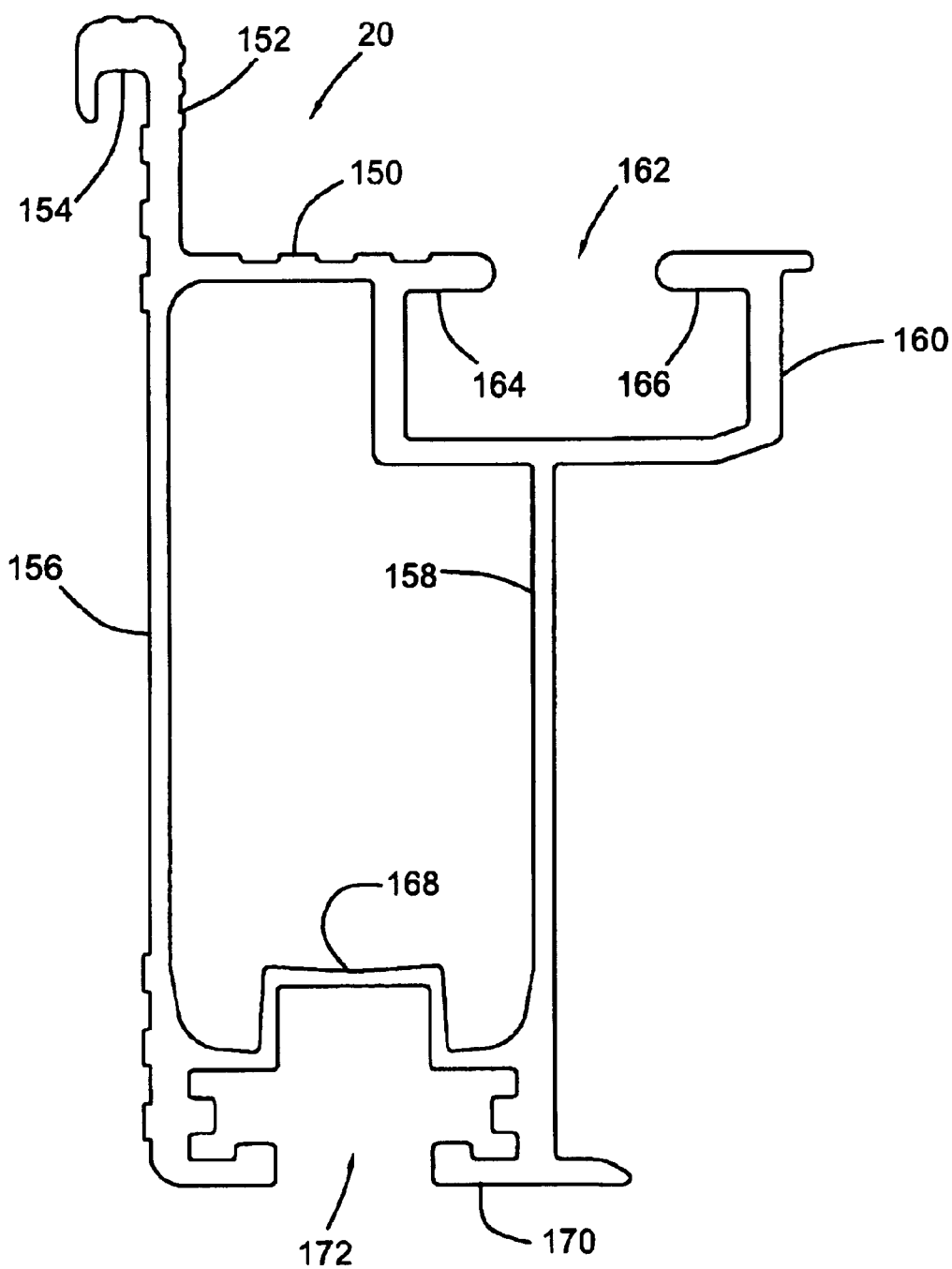
FIG. 8 is a cross-sectional view of a side structural member.

FIG. 8 is a cross-sectional view of a side structural member. Side structural member 20 has a portion 150 that is substantially at the level of the upper surface of bed 12. Portion 152 extends upwardly from the bed level and forms a raised portion at the sides of the trailer bed to assist in maintaining a load on the bed when being loaded. Portion 152 has an upper longitudinal channel 154 extending along its length, and is coupled to face portion 156. An inner member 158 is substantially parallel to face portion 156. A retention channel structure 160 is coupled to the upper end of inner member 158 and to portion 150, and forms a longitudinal retention channel 162 between longitudinal protrusions 164 and 166. Retention channel 162 is primarily provided to allow securing loads at desired position positions along the length of side structural member 20, for cross tying and the like. Other uses will be described below. A mounting structure 168 is coupled to the lower end of face portion 156 and the lower end of inner member 158. Mounting structure 168 has a lower surface 170, and a predetermined shaped longitudinal mounting channel 172 primarily utilized for a trailer axle at a desired position along the length of the side structural member 20. This mounting function and its other uses will be described in more detail below.

Figure 9:
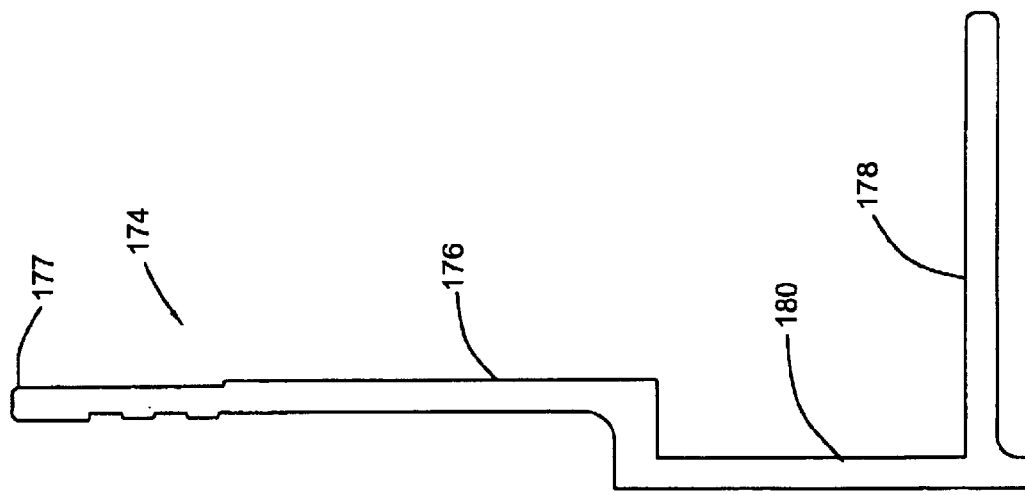
FIG. 9 is a cross-sectional view of a fender mount bracket.

FIG. 9 is a cross-sectional view of a fender mount bracket. Fender bracket 174 has an upper portion 176 with an upper end 177 and a lower portion 178 arranged perpendicular to the length of upper portion 176, and each coupled at opposite ends of off-set portion 180. Off-set portion 180 forms a longitudinal channel on the inside surface of bracket 174, and is used as a wiring run for electrical wiring to operate lights mounted on an associated fender, and provides room for mounting bolt heads that may be utilized in some applications to mount fender supports to bracket 174.

Figure 10:
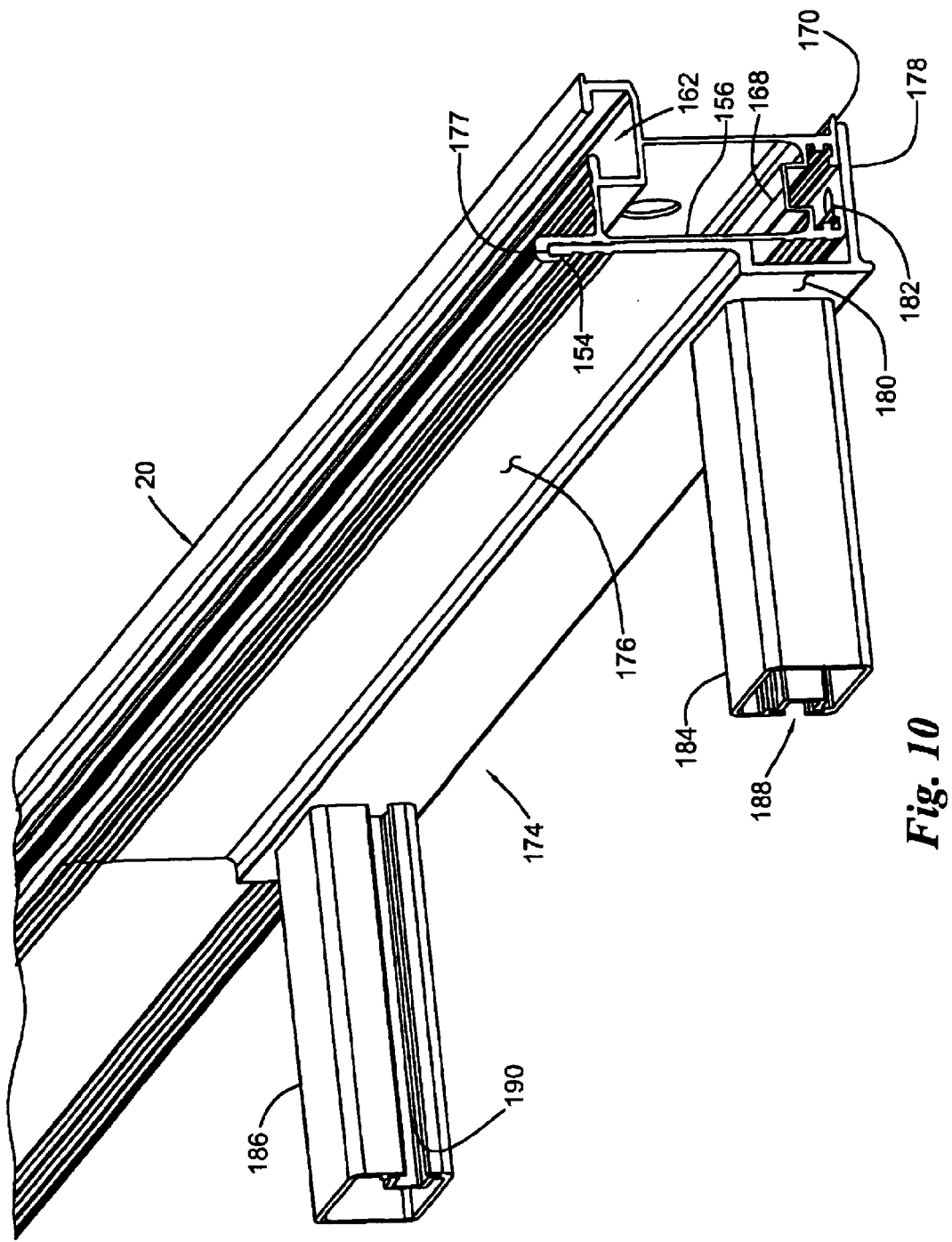
FIG. 10 is a partial perspective view of a fender support structure mounted on a side structural member.

FIG. 10 is a partial perspective view of a fender mount bracket. Bracket 174 has a predetermined length and is arranged along side structural member 20 to a position in proximity to the location of positioning the axle-supported wheels 14. The upper end 177 of upper portion 176 is slidably retained in the upper channel 154 and the inside face of upper portion 176 is positioned along face portion 156. The lower portion 178 is in contact with lower surface 170. One or more holes 182 are drilled in the lower portion 178 to receive mounting bolts (not shown) to hold bracket 174 in place, along with mounting the wheel and axle assembly to the side structural member 20. Fender support members 184 and 186 are mounted outwardly from bracket 174, and are utilized to support and mount a fender, such as fender 32 to the trailer. Fender support members 184 and 186 are attached to bracket 174, for example by welding, and are of sufficient strength to support a fender and to support steps 36 and 34, respectively. Members 184 and 186 have retention channels 188 and 190 along their respective lengths. These retention channels are configured to retain one or more captive nuts (not shown) along these channels, and are configured to cooperate with one or more bolts (not shown) that pass through mounting structures in the fender, and when tightened, hold the fender in place. The actual mounting arrangement for bracket 174 will be described in more detail below.

Figure 11:
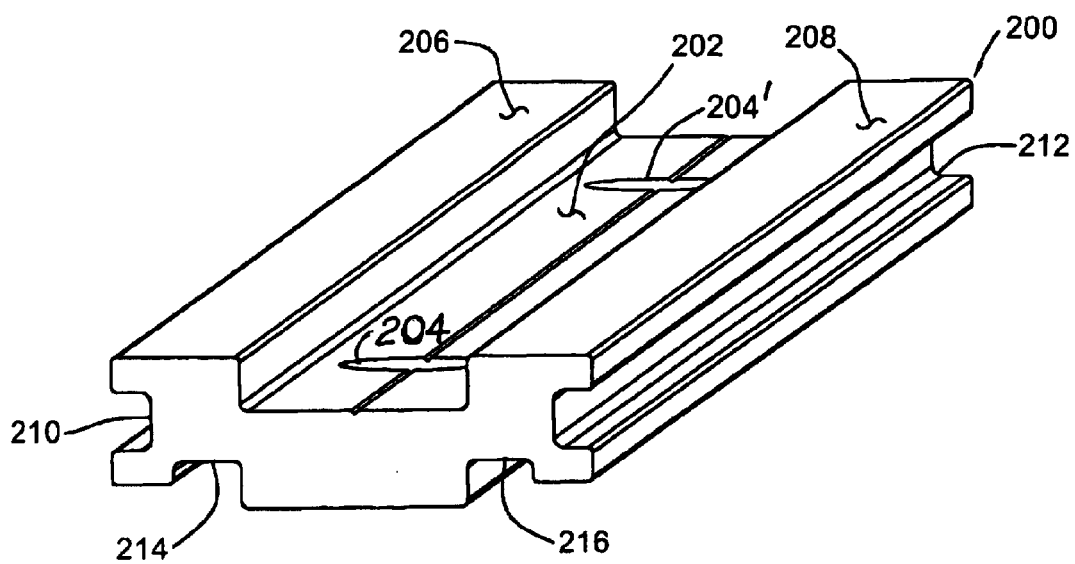
FIG. 11 is a three-dimensional view of a slidable axle and fender mounting member.

FIG. 11 is a three-dimensional view of a slidable axle and fender mounting member. The axle support member 200 is comprised of an extruded structure that is integrally formed having a central portion 202 with threaded bolt holes 204 and 204' therein. The bolt holes are utilized to receive the bolts (not shown) that affix an axle to the assembly. A pair of longitudinal engaging members 206 and 208 are formed at the sides of the center portion 202, and are formed with longitudinal channels 210 and 212, respectively. Members 206 and 208 have longitudinal channels 214 and 216, respectively, with channels 210, 212, 214, and 216 configured to mate with protrusions of associated ones of the mounting channel 172 of the side structural member.

Figure 12:
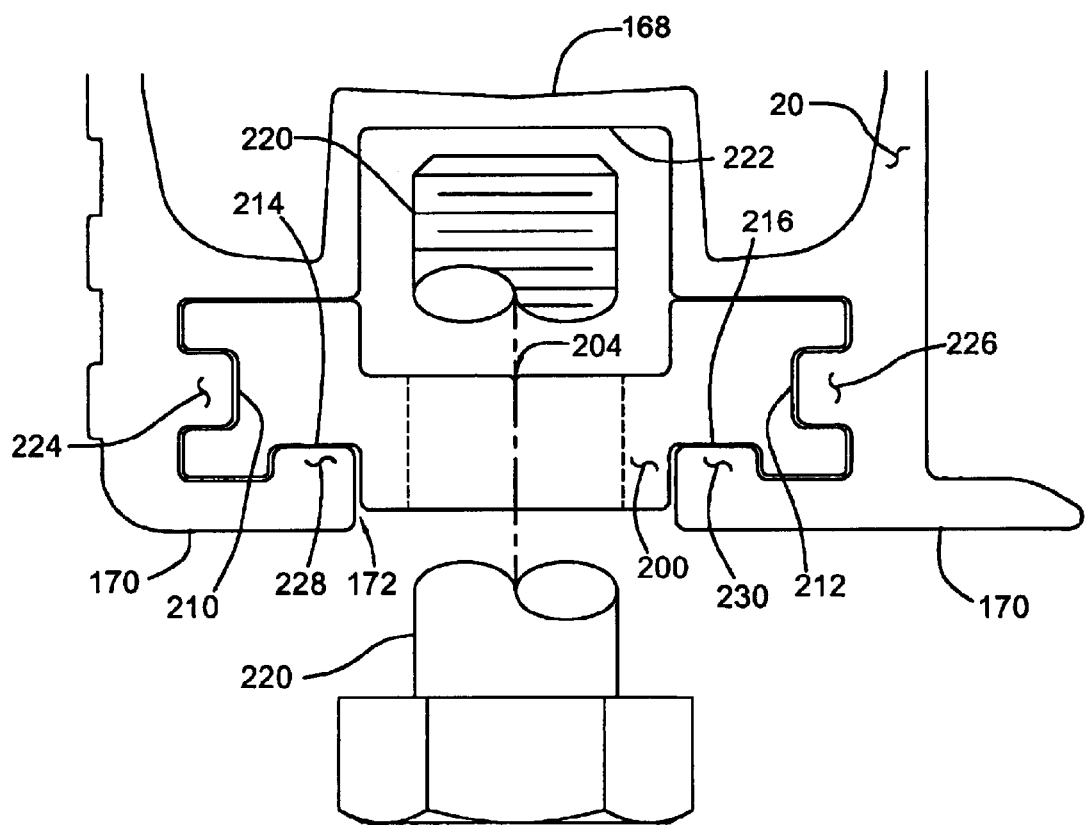
FIG. 12 is an end view of the slidable axle support member slidably engaged within the mating channel in the side structural member.

FIG. 12 is an end view of the slidable axle support member slidably engaged within the mating channel in the side structural member. The axle support member 200 is in slidable contact with the longitudinal channel 172 of side structural member 20. Upper surface of mounting structure 168 is slightly concave. This concave structure in conjunction with the design of the configured channel is operable as part of the locking mechanism to lock the axle support member 200 in place when its longitudinal placement selection is made. An axle and axle bracket (not shown) are affixed to the under surface 170 by passing associated bolts 220 (shown broken) through the appropriate threaded apertures 204 and 204'. The bolts are selected of sufficient length such that when inserted and tightened, they impinge on lower surface 222, and when tightened fully, exert upward pressure on mounting structure 168 to cause it to slightly deflect. This deflection produces a torque force along the members forming channel 172 and causes mounting protrusions 224 and 226 to be urged inwardly to engage channels 210 and 212, respectively. Protrusions 228 and 230 are urged inwardly and upwardly to engage channels 214 and 216, respectively. This clamping action of mating structures and the hold force of bolts 220 causes the axle mounting member 200 to be firmly locked in place.

Figure 13:
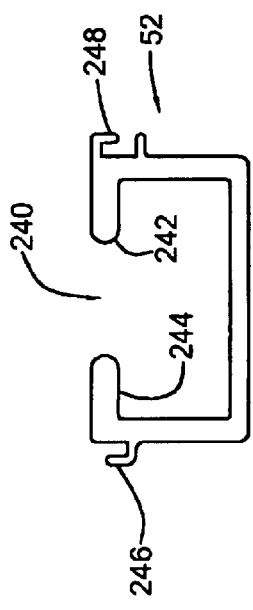
FIG. 13 is a cross-sectional view of a tie down track for use with aluminum bed members.

FIG. 13 is a cross-sectional view of a tie down track for use with aluminum bed members. Retention channel 52 has an upwardly extending channel opening 240 defined by protrusions 242 and 244. Members 246 and 248 are adapted to cooperate with formed edges of aluminum bed panels (not shown) and aid in holding them in place. For plywood bed members, the retention channel configuration illustrated in the identified cross-referenced patent application are preferred.

Figure 14:
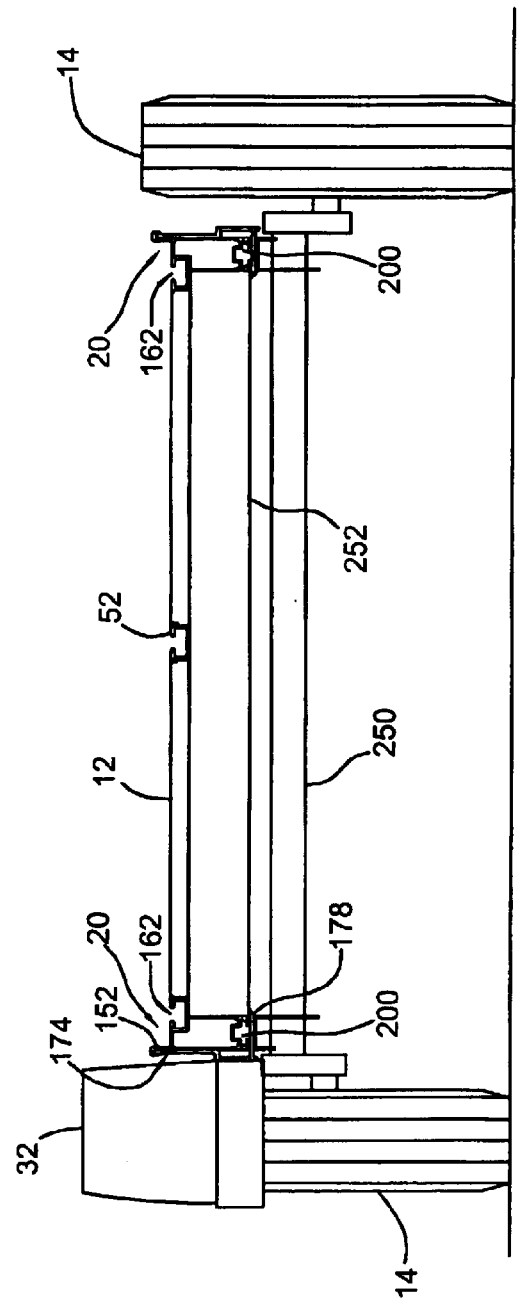
FIG. 14 is a partial rear view of a wheel, fender and axle assembly mounted on an adjustable axle support mechanism.

FIG. 14 is a partial rear view of a wheel, fender, and axle assembly mounted on an adjustable axle support mechanism. To provide the low profile, wheels 14 are set outside of the edges of bed 12, and are mounted to axle 250. The side structural members 20 are mounted via axle support members 200 to axle 250. Additional cross support members 252 can be utilized to support multiple bed portions 12. As shown, side retention channels 162 are provided at each side of the trailer and additional retention channel 52 is illustrated at the midpoint of bed 12. It is of course understood that the retention channel 52 need not be used, or that additional retention channels can be positioned as needed on bed 12. Fender 32 is illustrated mounted to side structural member 20 by mounting bracket 174 and held in place by member 178 being bolted to axle support member 200.

Figure 15:
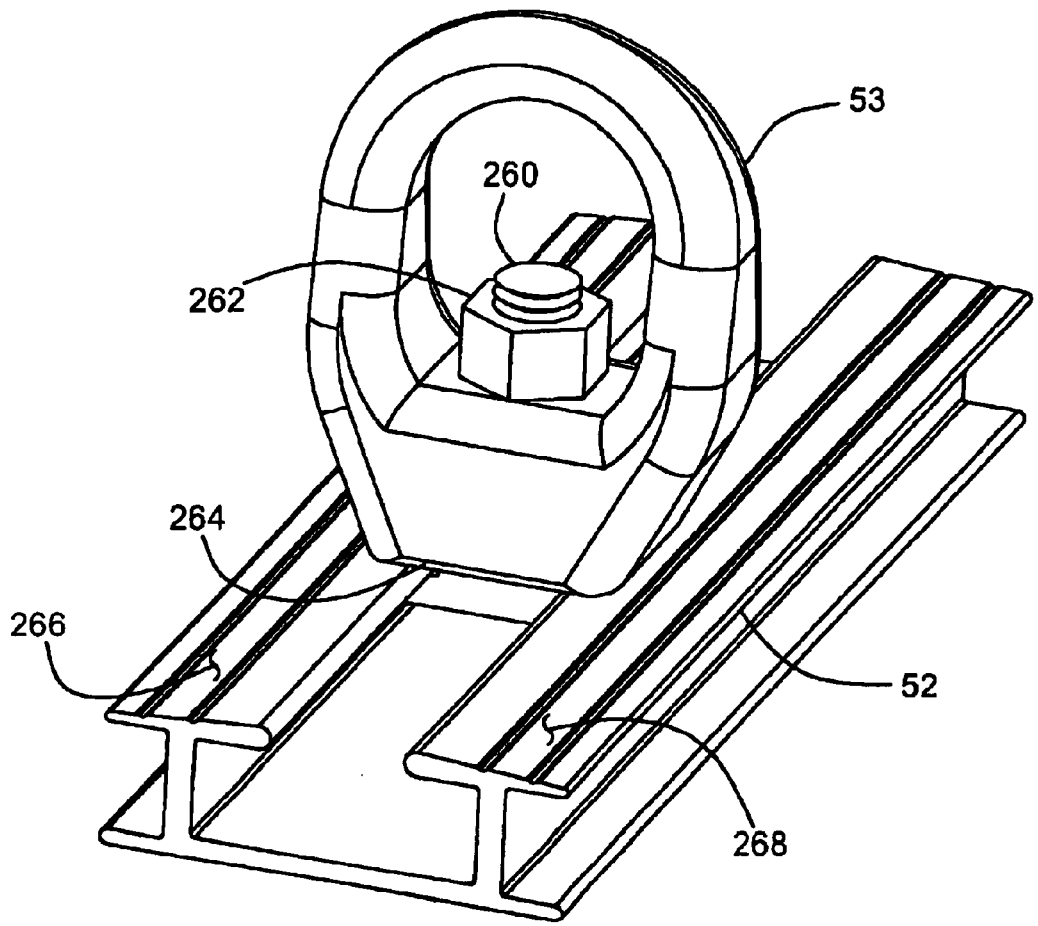
FIG. 15 is a three-dimensional view of a loop tie down device.

FIG. 15 is a three-dimensional view of a loop tie down device. A loop structure 53 is configured to cooperate with any retention channel, and is shown with respect to central retention channel 52. It is of course understood that a loop structure 53 is also utilized with the side retention channels 162. A bolt 260 cooperates with a slidable retention device, which will be described below, and when nut 262 is tightened, operates to hold the lower surface 264 of loop 53 in contact with the upper surfaces 266 and 268 of channel 52, thereby providing a secure mechanism to tie down a load. Though a loop structure is shown, the tie-down could have alternative shapes including but not limited to cleats, hooks, or the like.

Figure 16:
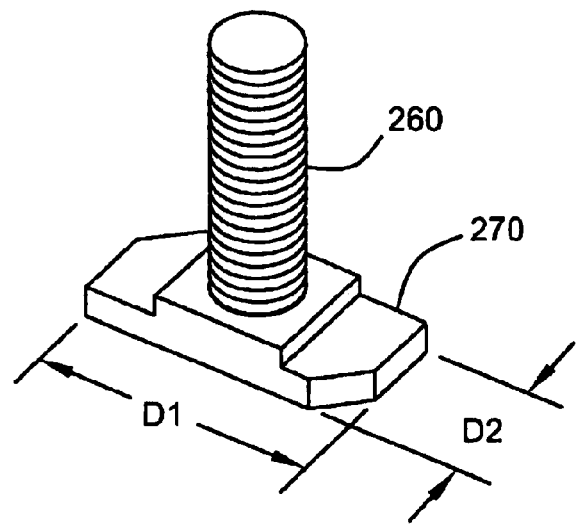
FIG. 16 illustrates a releasable structure for use with loop tie down device.

FIG. 16 illustrates a releasable structure for use with a loop tie down device. A retention member 270 is affixed to bolt 260. Member 270 has a first dimension D1 that is wider than the channel opening of retention channel 52. It has a second dimension D2 that is narrower than the channel opening of retention channel. This configuration allows the releasable structure to be positioned in a first position to cause it to be retained within the retention channel when nut 262 is tightened; and, when in a second position allows it to be released upwardly and outwardly through the retention channel opening when nut 262 is released and the releasable structure is rotated for releasable alignment. In this manner, the tie down loops 53 can be inserted as necessary in the appropriate retention channels, positioned, rotated and the associated nut 262 tightened down. In this manner, the tie down loops 53 can be positioned as desired along any of the retention channels and can be readily removed as necessary or desired.

Figure 17:
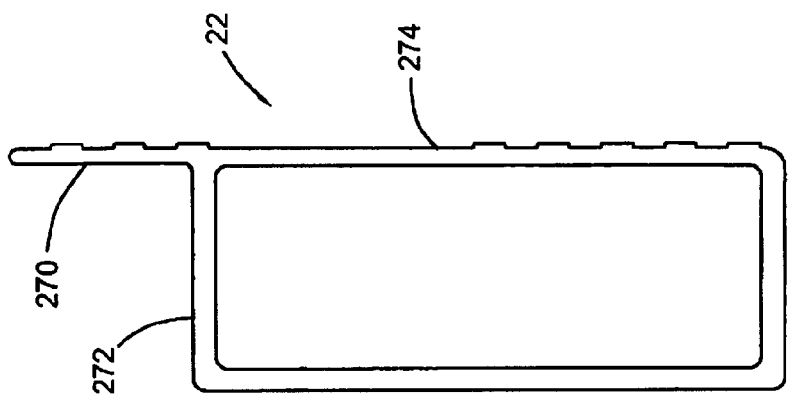
FIG. 17 is a cross-sectional view of a front structural member.

FIG. 17 is a cross-sectional view of a front structural member. Front member 22 is of a box beam cross section having an upper portion 270 extending above the level of the bed 12. An upper surface 272 supports an associated bed member. A face portion 274 has a facial ridged configuration for additional strength. Front member 22 is assembled with side structural members 20 by welding or other suitable joining methods.

Figure 18:
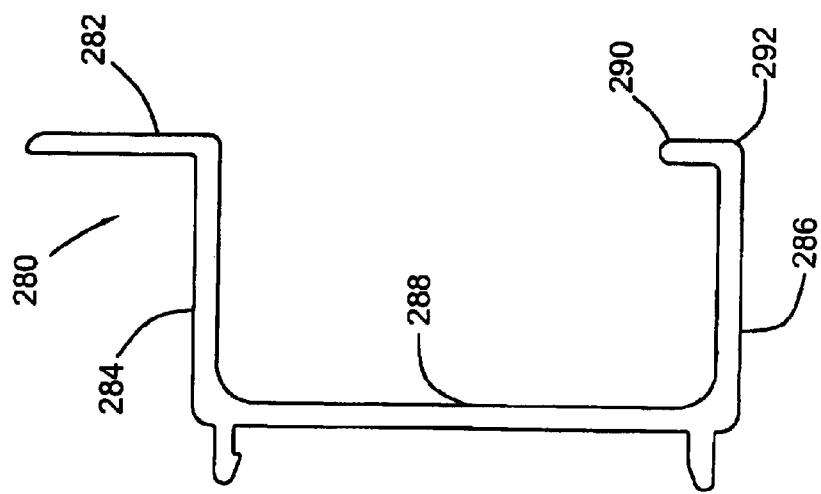
FIG. 18 is a cross-sectional view of a rear channel structural member.

FIG. 18 is a cross-sectional view of a rear channel structural member 280 having an upward projecting portion 282 to protect the edge of an associated bed member which is supported on surface 284. Lower projection 286 and member 288 form a channel across the rear of the trailer in which lights and reflectors can be mounted and protected from breakage. Projection 290 is upwardly extending to provide additional strength and provide a juncture 292 that can engage the ground when the bed is tilted and the tilt limiting structure is not lowered. The tilt limiting loading ramp is mounted to upward projection 282 by mating hinge structures (not shown).

Figure 19:
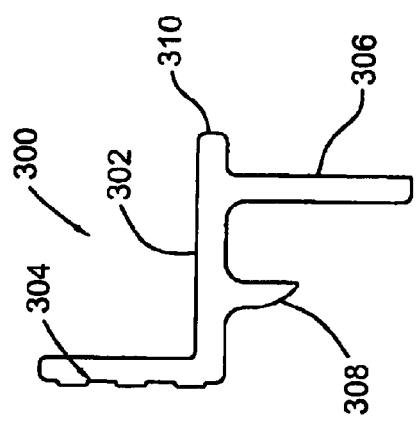
FIG. 19 illustrates a railing bracket.

FIG. 19 illustrates a railing bracket 300 having a horizontal support surface 302 and vertical support member 304. A downwardly extending member 306 and downwardly extending member 308 are positioned to form a channel that rests on the upper portion 152 of side structural member 20. A lip portion 310 is positioned to cooperate with a mounting bracket that will be described below.

Figure 20:
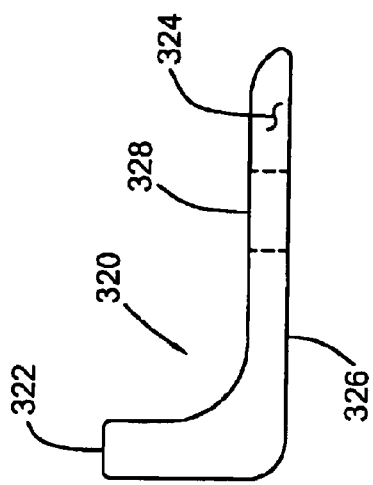
FIG. 20 illustrates a railing bottom holding member mounted to a side structural member.

FIG. 20 illustrates a railing bottom holding member mounted to a side structural member. Holding member 320 has an upwardly extending member 322 arranged to mate with downwardly extending member 306 of the railing bracket 300. A mounting portion 324 has a lower surface 326 adapted to be supported upon portion 150 of side structural member 20 and to extend across retention channel 162. One or more apertures 328 are provided to cooperate with associated releasable structures (see FIG. 16) to mount the railing bottom holding member to as associated retention channel.

Figure 21:
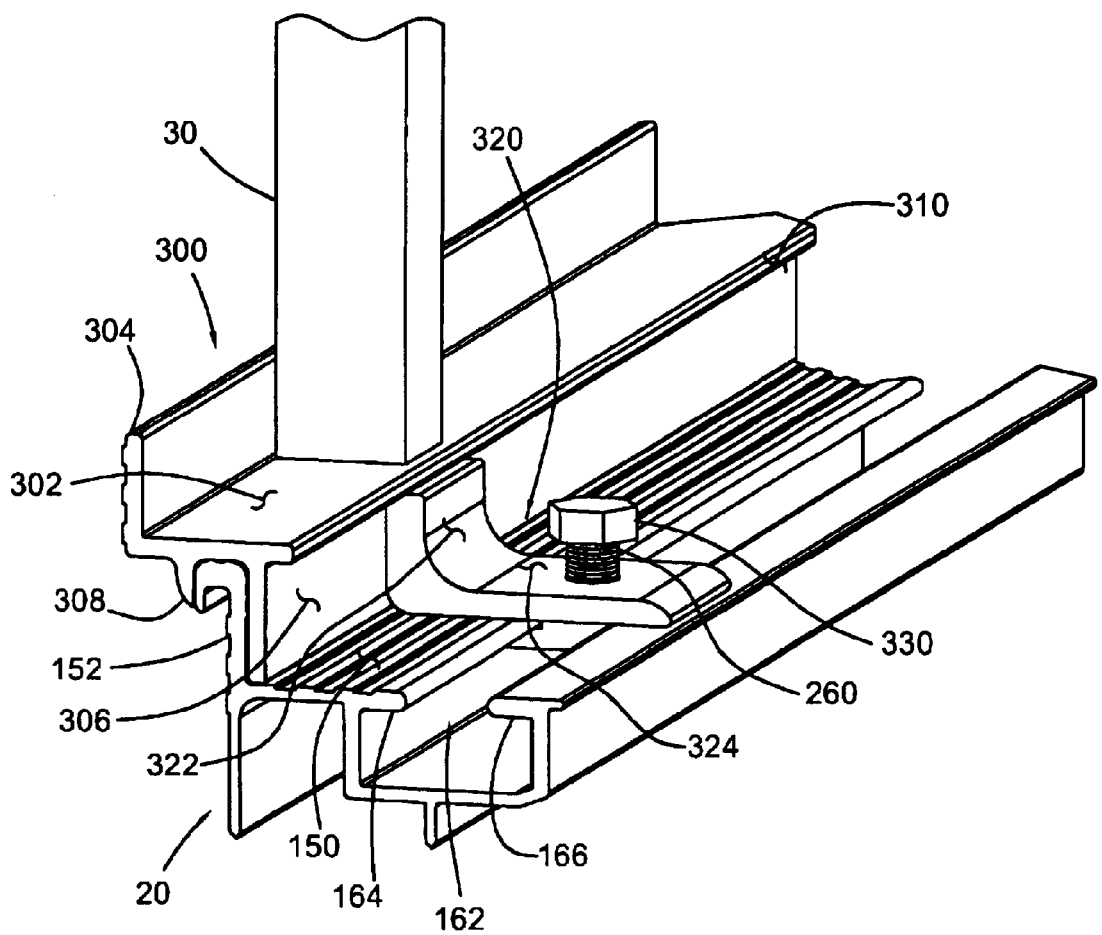
FIG. 21 is a broken three-dimensional view of a mounted railing bottom member.

FIG. 21 is a broken three-dimensional view of a mounted railing bottom member. The bottom of a railing post 30 is affixed, for example by welding, to supporting surface 302 and vertical support member 304 of the railing bracket 300. Bracket member 308 encompasses the downwardly extending portion of raised portion 152 of side structural member 20. Holding member 320 is supported on portion 150 and extends across retention channel 162. The holding member 320 has upwardly extending member 322 in contact with downwardly extending member 306 of the bracket 300. The structure is held in place by nut 330 that cooperates with a bolt 260 on a releasable structure retained within retention channel 162 by retention protrusions 164 and 166. This arrangement allows an auxiliary railing structure to be affixed to the trailer or to be removed as desired.

From the foregoing detailed description it can be seen that the various extruded and integrally formed members can be adapted to various lengths for differing size trailers or different configurations of deck support structures. Such formation from non-corrosive materials provides long-lasting structures, greatly simplifies the manufacturing processes, and simplifies the supply of materials for spare parts. The various features of assembly and slidable adjustments provide substantial benefits in flexibility of assembly and use in operation.

Having described the preferred embodiment of the invention in conjunction with the drawings, it can be seen that the various purposes and objectives of the invention have been achieved in the preferred embodiments, and that the best mode has been described. Various modifications and extensions will become apparent to those skilled in the art within the spirit and scope of the invention. Accordingly, what is intended to be protected Letters Patent is set forth in the appended claims.

I claim:

1. A tilt-bed trailer comprising:
   a bed supporting frame including at least two oppositely disposed side structural members;
   at least two axle mounted wheels coupled to said bed supporting frame;

a bed having a load supporting surface, a predetermined bed length dimension and a predetermined bed width dimension, said bed supported on said bed supporting frame;

an elongated tongue structure rotatably coupled to said bed supporting frame;

a tongue retention and release mechanism to selectively retain said bed supporting frame in contact with said elongated tongue structure or to release said bed supporting frame from said elongated tongue structure to allow said bed supporting frame to tilt;

a tilt limiting loading ramp rotatably coupled to said bed supporting frame, said tilt limiting loading ramp having a predetermined ramp length and including a tilt limiting structure to engage a loading surface to limit the slope of tilt of said bed such that said load supporting surface of said bed and said tilt limiting loading ramp are substantially aligned when loading or unloading a wheel supported load.

2. A tilt-bed trailer as in claim 1, wherein said tilt limiting loading ramp comprises:

a ramp structure having a plurality of cross members, including a mounting member having a hinge structure affixed, said mounting member having a first predetermined length extending across a substantial portion of said bed width dimension, a loading surface engaging member, and two or more spaced apart wheel supporting members, said plurality of cross members spaced apart a distance to prevent the wheels of the wheel supported load from passing therebetween; and a plurality of spaced apart structural members including a pair of ramp side members, each coupled between said mounting member and said load surface engaging member, and two or more support members coupled intermediate said mounting member and said surface engaging member and to associated ones of said two or more spaced apart wheel supporting members; and wherein said tilt limiting structure is affixed to said mounting member at a predetermined angle to said plurality of structural members, said tilt limiting structure having a predetermined length extending along a second predetermined substantial portion of said load width dimension, and having a predetermined height dimension to establish a predetermined slope ratio of said ramp structure to said tilt limiting structure.

3. A tilt-bed trailer as in claim 2, wherein said two or more support members have substantially an I-beam cross-section providing opposite mounting channels; and associated ends of ones of said two or more spaced apart wheel supporting members are affixed in associated ones of said mounting channels.

4. A tilt-bed trailer as in claim 2, wherein said predetermined ramp length is less than about one-fourth said predetermined bed length dimension and is in the order of about four times said height dimension of said tilt limiting structure.

5. A tilt-bed trailer as in claim 2, and further including a first retention channel along one of said pair of oppositely disposed side structural members, and a second retention channel along the other one of said pair of oppositely disposed side structural members.

6. A tilt-bed trailer as in claim 5, wherein each of said at least two oppositely disposed side structural members are integrally formed with an associated one of said first retention channel and said second retention channel.

7. A tilt-bed trailer as in claim 5, and further including at least one additional retention channel disposed between said first retention channel and said second retention channel on said load supporting surface of said bed and used to selectively tie down a load.

8. A tilt-bed trailer as in claim 7, and further including one of more tie down loop structures adjustably positioned in one or more associated ones of said first retention channel, said second retention channel, and said at least one additional retention channel, each said tie down loop structure slidably positionable along its associated one of said retention channels.

9. A tilt-bed trailer as in claim 1, wherein each of said pair of oppositely disposed side structural members, comprises:

an elongated body having a predetermined length, and first and second ends;

said elongated body having an upper portion extending upwardly from said load supporting surface, an outer surface and an inner surface, said upper portion including an upper channel;

a face portion coupled at its upper extremity to said upper portion, and having a first lower extremity;

an elongated retention channel coupled at said inner surface substantially at the level of said load supporting surface, said elongated retention channel having a first predetermined channel shape, with a retention channel opening upwardly from said load supporting surface;

an inner member having an upper extremity coupled to said elongated retention channel and having a second lower extremity; and a lower channel structure coupled to said first lower extremity and to said second lower extremity, said lower channel structure having a second predetermined shape including a mounting structure with a mounting channel opening downwardly, said lower channel structure including oppositely disposed ridged mounting surfaces.

10. A tilt-bed trailer as in claim 9, and further including a slidable axle support member having a predetermined length, a thickness dimension, one or more threaded holes through said thickness dimension, and oppositely disposed engaging structures having predetermined shapes to mate with and slidably engage said oppositely disposed ridged mounting surfaces.

11. A tilt-bed trailer as in claim 9, and further including a rack structure having a first mounting member removably mounted to said elongated retention channel of one of said at least two oppositely disposed side structural members;

a second mounting member removably mounted to said elongated retention channel of the other one of said at least two oppositely disposed side structural members;

a plurality of spaced apart upright post members each having a lower end affixed to an associated one of said first mounting member or said second mounting member;

one or more spaced apart railing members affixed to associated ones of said plurality of spaced apart upright post members; and a railing structure coupled to said one or more spaced apart railing members across said predetermined bed width dimension.

12. A tilt-bed trailer as in claim 9, and further including a fender mounting bracket mounted to each of said side structural members, each in a predetermined relationship with an associated one of said at least two wheels, each said fender mounting bracket including an upper extension having an upper edge engaged and retained by said upper channel, a middle portion in contact with an associated said face portion, and a lower portion at a predetermined angle to said middle portion capable of being arranged below an associated slidable axle support member and adapted to be affixed thereto.

13. A tilt-bed trailer as in claim 12, and further including a pair of fender supports mounted to each of said fender mounting brackets, each of said fender supports having a predetermined length and a captive nut retaining channel extending along said predetermined length to slidably engage one or more captive nuts along said length to cooperate with one or more fender mounting bolts to mount an associated fender.

14. A tilt-bed trailer as in claim 1, wherein said elongated tongue structure includes opposite sides each having a channel extending along its length and having a hitch end; and further including a height adapter mounted at said hitch end, said adapter having an upper surface to mount a hitch mechanism, and oppositely disposed downwardly extending gripping members each to cooperate with and grip a portion of an associated said channel on said elongated tongue structure, and said adapter having a predetermined height to cause said elongated tongue structure to have a predetermined relationship relative to the ground when in cooperation with a hitch structure on a towing vehicle.

15. A tilt-bed trailer comprising:

supporting means for supporting a trailer bed, said supporting means including side structural means for mounting a wheel assembly;

bed means mounted on said supporting means for supporting a load;

tongue means rotatably coupled to said supporting means for allowing the trailer to be towed by a vehicle;

tongue retaining means for releasably coupling said tongue means to said supporting means for allowing said bed means to tilt when released;

ramp means hingedly coupled to said supporting means for loading and unloading a wheel supported load on said bed means, said ramp means including tilt limiting means for engaging a loading surface and limiting the slope of tilt of said bed means such that said ramp means and said bed means are substantially aligned when loading or unloading the wheel supported load.

16. A tilt-bed trailer as in claim 15, wherein said side structural means includes retaining means for releasably holding slidably adjustable tie down means for tying down the load.

17. A tilt-bed trailer as in claim 16, wherein said side structural means further includes mounting means for adjustably mounting the wheel assembly as desired along the length of said side structural means.

18. A tilt-bed trailer as in claim 17, and further including fender mounting means coupled to said side structural means for mounting an associated fender in a desired position along said side structural means in relation to an associated wheel, and for coupling to said mounting means for holding said fender mounting means in place.

19. A tilt-bed trailer as in claim 15, and further including height adapting means coupled to said tongue means for establishing a predetermined height adjustment for maintaining said tongue means in a predetermined relationship to the ground surface when hitched to the towing vehicle.

* * * * *